United States Patent [19]

Tagami et al.

[11] Patent Number: 4,652,853

[45] Date of Patent: Mar. 24, 1987

[54] MULTIPLE COMMUNICATION SYSTEM FOR VEHICULAR BODIES

[75] Inventors: Katsutoshi Tagami; Yoshikazu Tsuchiya; Kazuo Nakamura, all of Saitama, Japan

[73] Assignee: Honda Giken Kogyo Kabushiki Kaisha, Tokyo, Japan

[21] Appl. No.: 640,762

[22] Filed: Aug. 14, 1984

[30] Foreign Application Priority Data

| Aug. 15, 1983 | [JP] | Japan | 58-148993 |
| Aug. 15, 1983 | [JP] | Japan | 58-148994 |
| Sep. 2, 1983 | [JP] | Japan | 58-161598 |
| Sep. 2, 1983 | [JP] | Japan | 58-161599 |
| Sep. 5, 1983 | [JP] | Japan | 58-162911 |
| Sep. 5, 1983 | [JP] | Japan | 58-162912 |

[51] Int. Cl.$^4$ .............................. B60Q 1/00
[52] U.S. Cl. .................. 340/52 F; 340/825.06; 307/10 R
[58] Field of Search ........... 340/52 F, 825.54, 825.08, 340/825.06, 825.05, 825.17, 825.16; 371/8, 9, 11, 14; 307/10 R

[56] References Cited

U.S. PATENT DOCUMENTS

| 4,360,912 | 11/1982 | Metz et al. | 340/825.54 |
| 4,463,341 | 7/1984 | Iwasaki | 340/52 F |
| 4,516,121 | 5/1985 | Moriyama et al. | 340/52 F |
| 4,535,401 | 8/1985 | Penn | 340/825.06 |
| 4,546,351 | 10/1985 | Nambu | 340/825.08 |

OTHER PUBLICATIONS

*Computer Networks for Distributed Information Systems,* Chorafas, Dimitris N., ©1980, Petrocelli Books Inc., pp. 122 and 131.

*Primary Examiner*—Glen R. Swann, III
*Assistant Examiner*—Jeffery A. Hofsass
*Attorney, Agent, or Firm*—Irving M. Weiner; Joseph P. Carrier; Pamela S. Burt

[57] ABSTRACT

A multiple communication system for vehicular bodies, including a plurality of job units each respectively provided with a detection object as a signal source and an electric load, and at least one signal line commonly connected to all of the job units, in which the order of signal transmission of a data signal based on a substantially real-time condition of the corresponding detection object from each of the job units is determined in accordance with a data signal from a particular one of the job units.

The multiple communication system may, additionally comprise a management unit for outputting to the signal line an address signal for specifying that one of the job units which is to become next to output to the signal line a data signal based on a substantially real-time condition of the signal source.

7 Claims, 20 Drawing Figures

MULTIPLE COMMUNICATION SYSTEM FOR VEHICULAR BODIES

BACKGROUND OF THE INVENTION

1. Field of the Invention

The present invention generally relates to a multiple communication system for vehicular bodies. More particularly, it relates to a multiple communication system for vehicular bodies such as automobiles, of the type which includes a plurality of job units each respectively provided with one or more detection implements for obtaining data by detecting the status of detection objects such as a sensor and a switch, and with one or more electrical loads such as a lamp, an indicator, and a pump to be driven on the basis of data obtained at other job units

2. Description of Prior Art

Recently, in the automotive art typically representing the field of vehicular bodies, there have been developed and put into practice a variety of control units, accompanied by an increased degree of complexity, as well as the enlargement of scale, in a signal transmission system, with the intensified tendency to complicate and scale up its wiring harness. In this respect, for the purpose of system rationalization, and particularly for the simplification of the wiring harness, there has been proposed a number of multiple communication systems for vehicular bodies, in which various signals are composed to be multiplied to thereby permit their transmission through a wiring harness with a smaller number of conductors.

One successful example of such conventional multiple communication systems is proposed in Japanese Patent Lay-Open Print No. SHO57-32155 filed on Feb. 2, 1980, of which the entire system structure is illustratively shown in FIG. 19 of the accompanying drawings.

In FIG. 19, generally designated at reference numeral 500 is a multiple communication system including a plurality of terminal units 514$l$ to 514-$p$ having their digital signal sources S$_l$ to S$_k$, digital electric loads l$_1$ to l$_l$, analog signal sources M$_l$ to M$_m$, and analog electric loads L$_l$ to L$_n$, respective pairs of address signal lines 512A-1, 512A-2 and data signal lines 513D-$d$, 513D-$a$ each commonly connected to all of the terminal units 514-$l$ to 514-$p$, and an address signal source 511 connected to supply an address signal to the address signal lines 512A-1, 512A-2. The address signal has a data structure consisting of eight bits, in which those four bits occupying upper places are output through one address signal line 512A-1 and the remaining four bits, put in lower places, through the other address signal line 512A-2. Of the data signal lines 513D-$d$, 513D-$a$, one (513D-$d$) is adapted for digital data signals and the other (513D-$a$) for analog data signals. The address signal source 511 is designed so as to produce a series of address signals up to a maximum of 256 locations. Each address signal reaching the respective terminal units 514-$l$ to 514-$p$ is deemed to be of the same phase.

The communication system 500 has such a function that, when an address signal is produced, a data signal is output from one terminal unit 514-$m$ to the data signal line 513D-$d$ or 513D-$a$ in accordance with the real-time status of such a digital or analog signal source of the terminal unit 514-$m$ that is identified by the produced address signal, and such a digital or analog electric load of another terminal unit 514-$n$ that is identified by the address signal is driven on a real-time basis in accordance with the output data signal on the data signal line 513D-$d$ or 513D-$a$. Namely, any address signal identifies a digital or analog signal source of one particular terminal unit and a digital or analog electric load of another particular terminal unit so that, when the address signal is produced, a data signal is to be output from the corresponding signal source of the former terminal unit and the corresponding electric load of the latter terminal unit is to be driven in accordance with the data signal.

In such a conventional multiple communication system for vehicular bodies, a plurality of terminal units have a signal transmission network thereamong consisting of a pair of address signal lines and a pair of data signal lines, thus effectively preventing the wiring harness from becomming complicated and large-sized, thereby permitting improved facilitation of system maintenance.

In such a multiple communication system, however, any data signal from any data signal source of any terminal unit is required to be processed at the same time when an address signal source has produced an address signal identifying the data signal source, thus practically permitting no long-time operations to be controlled by such data signals.

Moreover, in such a communication system, no consideration is provided for informing, when any data signal source or electric load of any terminal unit is caused to malfunction, a driver of the malfunction, so that the system would continue working even when trouble develops at such a terminal unit.

Incidentally, in such a system, some of those terminal units located at particular portions of a certain vehicular body may be provided with an electric load that needs an extremely quick response. For example, the system may have an electric horn or a brake lamp which are required to quickly respond without delay when a driver operates a horn switch or pedals a brake. In this respect, such a system, however, is unsuccessfully adapted to quickly transmit a data signal, from a terminal unit for detecting an operator's operations such as to a horn switch and a brake, to another terminal unit controlling corresponding electric loads such as an electric horn and a brake lamp.

Further, such a system is provided with an address signal producer which, when caused to malfunction, disables the signal transfer among terminal units, thus undesirably adversely affecting the function of the entire system.

The present invention has been achieved to effectively overcome such disadvantages in a conventional multiple communication system for vehicular bodies.

SUMMARY OF THE INVENTION

According to the present invention, there is provided a multiple communication system for vehicular bodies, including a plurality of job units dispersively arranged at predetermined locations of a vehicular body, each of the job units is respectively provided with a detection object as a signal source and an electric load. At least one signal line is commonly connected to all of the job units, and there is provided a means for supplying, from a particular one of the job units, a data signal based on the detection object of the particular job unit to the signal line, when the data signal from the particular job unit is supplied by the aforesaid means to the signal line, at least one of the others, other than the particular one of the job units, inputs and decodes the data signal to drive the electric load of at least one of the job units. Each of the job units exclusively performs the transmission and the reception of the data signal, and, when the particular job unit transmits the data signal, all the remaning ones of the job units receive the data signal and, in accordance with the content of the data signal, that one of the job units which comes to be next to transmit the data signal is determined, such that the signal transmitting and receiving actions of each of the job units are sequentially executed.

The communication system according to the invention may further comprise a management unit connected to the signal line to receive the data signal as transmitted from each of the job units, to thereby monitor the conditions of the respective job units, the management unit being adapted to supply the signal line with an abnormality detection signal when an abnormality is verified with respect to any of the job units in the sequential signal transmitting actions of the respective job units, to give information on the job unit verified of the abnormality to those of the job units other than the job unit verified of the abnormality, to thereby identify that one of the job units which is to come to execute the signal transmitting action to the next to the job unit verified of the abnormality.

According to the present invention, there is also provided a multiple communication system for vehicular bodies, including a plurality of job units dispersively arranged at predetermined locations of a vehicular body, the job units being each respectively provided with a detection object as a signal source and an electric load, at least one signal line commonly connected to all of the job units, and a means for supplying, from a particular one of the job units, a data signal based on the detection object of the particular job unit to the signal line. In such system, when the data signal from the particular job unit is supplied by the means to the signal line, at least one of the others, other than the particular one of the job units, inputs and decodes the data signal to drive the electric load of at least one of the job units, wherein the means comprises a management unit connected to the signal line and adapted to output to the signal line an address signal for specifying the signal transmission order of the job units, and wherein each of the job units sequentially performs the transmission in accordance with the address signal, such that the transmission and the reception of the data signal of each of the job units are exclusively performed.

The communication system according to the invention may be such that at least one of the job units is adapted to output at a predetermined timing a priority demand signal for instructing such job unit to output the data signal with a priority to those of the job units other than such job unit, and that the management unit is adapted to output, when the priority demand signal is output, an address signal for instructing the job unit having output the priority demand signal to execute the signal transmitting action, with a priority to an address signal specifying that one of the job units in a normal place of the signal transmission order.

Moreover, the communication system according to the invention may be such that the management unit is adapted to always monitor the data signal output from each of the job units, and not to output, after the data signal output from any of the job units is verified of an abnormality, an address signal specifying the job unit verified of the abnormality.

Further, the communication system may be such that each of the job units is adapted to always monitor the address signal output from the management unit, and that, after the address signal as output is verified of an abnormality, when the particular job unit receives a data signal, all the remaining ones of the job units receive such data signal and, in accordance with the content of such data signal, that one of the job units which is to come to be next to transmit a data signal is determined, such that the signal transmitting actions of the respective job units are sequentially executed.

Accordingly, an object of the present invention is to provide a multiple communication system for vehicular bodies, which is facilitated to cope with the enlargement of scale attendant various potential expansions of the function of the vehicular body and permits a simple system design, in addition to securing a necessary time period for each process to be executed in accordance with a data signal from a corresponding job unit.

Another object of the present invention is to provide a multiple communication system for vehicular bodies, which is quickly functionable to counter the occurrence of an abnormal condition at any job unit, thereby securing the normal function of the entire system to a maximum extent, thus favorably improving the system reliability.

Still another object of the present invention is to provide a multiple communication system for vehicular bodies, which favorably permits the facilitation to cope with the enlargement of system scale, and in which the working conditions of respective job units are always monitored with a management unit, thus enabling a quick counteraction against the occurrence of an abnormal condition at any job unit.

Yet another object of the present invention is to provide a multiple communication system for vehicular bodies, which can successfully satisfy the funtional requirements of associated implements needing quick actions without delay, while effectively relieving a driver from any sense of incompatibility.

The present invention has as another object to provide a multiple communication system for vehicular bodies, in which the removal of any malfunctioning job unit is promptly effected, thus maintaining as high as possible the reliability of the entire system.

The present invention has as still another object to provide a multiple communication system for vehicular bodies, in which, when a management unit is caused to malfunction, the removal of the management unit is quickly effected, while the signal transmitting function of the entire system is secured to a maximum extent, thereby effectively maintaining the functional reliability of the system.

The above and further features, objects and advantages of the present invention will more fully appear from the following detailed description of the preferred embodiments of the invention when the same is read in conjunction with the accompanying drawings.

DETAILED DESCRIPTION OF THE PREFERRED EMBODIMENTS

Figure 1:
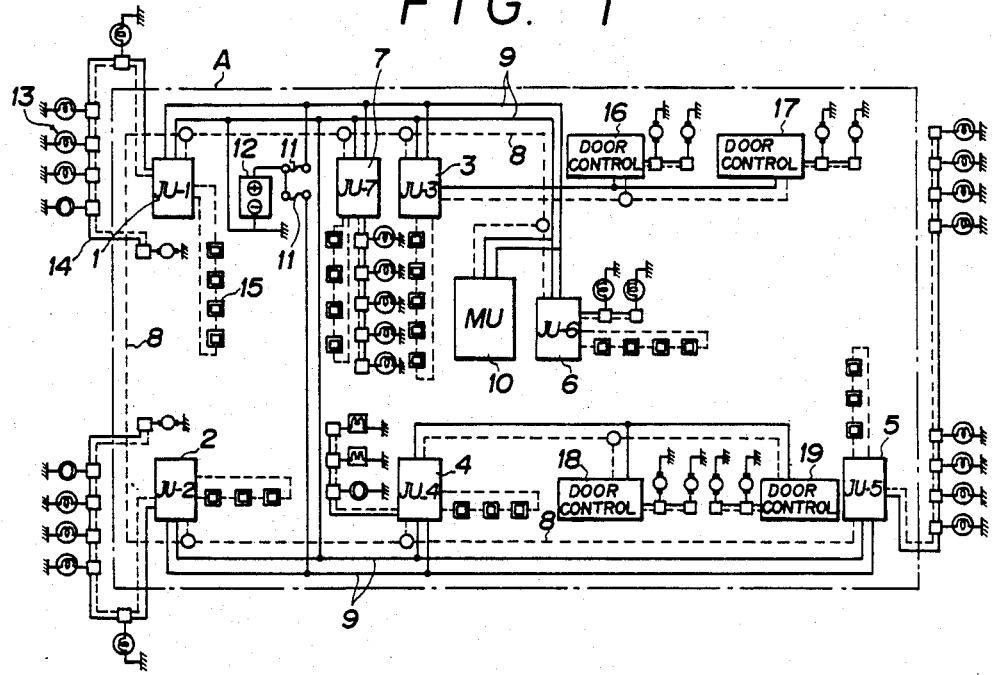
FIG. 1 shows a schematic of the whole part. A vehicular body equipped with a multiple communication system according to a first embodiment of the invention of FIG. 2 shows a schematic constitution of the multiple communication system of FIG. 1.

Referring first to FIG. 1, designated at reference character A is a block as a schematic representation of the outline of a vehicular body such as an automobile, delineated by alternate long and short dash line. In FIG. 1, the left is assumed to be the frontward direction of the vehicular body, and the right, the rearward direction thereof. In and around the block A representing the vehicular body, there are shown various components of a signal processing and transmission system as a multiple communication system according to a first embodiment of the invention, the components being diagrammatically identified for the location and connection of a set of below-described control units and for those of associated electrical loads as well as of respective implements such as for operation, detection, and indication.

The set of control units comprises a septuple of job units as terminal devices 1 to 7 and a single management unit 10, the units 1 to 7 and 10 having incorporated their microcomputers (not shown) each respectively provided with particular signal reception and transmission functions, thus constituting a dispersive control system. With respect to the system layout on the vehicular body A, in the right front part is located a job unit 1, in the left front part a job unit 2, in the right central part a job unit 3, in the left central part a job unit 4, in the left rear part a job unit 5, substantially at the center a job unit 6 and the management unit 10, and in the vicinity of certain implements for indication by a driver's seat (not shown) a job unit 7. Such an arrangement of the control units actually depends on their positional relationship with the associated loads as well as with the implements for operation, detection, indication and the like.

The multiple communication system includes a signal transmission network and a power supply network separated from the transmission network, the networks both independently covering the entirety of the communication system. The transmission network comprises a multiplied optical data transmission bus 8 using a later-described optical fiber, while the supply network consists of an electric supply line a connecting a battery 12 through an interruptable means 11 to the respective job units 1 to 7 and the management unit 10. In other words, with respect to the circuitry of FIG. 1, the broken line represents the data bus 8 made of the optical fiber, and the solid line represents the supply line 9 of an electric conductor. Moreover, at the job units 1 to 7, as described later, respective detection means adapted to detect the status of associated detection objects to output corresponding detection signals as data, as well as respective signal conversion means serving for associated electrical loads, are each constituted with an optical processing circuit by use for example, of an optical switch or a spectroscopic element. Such being the case, in the communication system according to the invention, as a whole, signals are optically processed in the form of a later-described multiple signal using a beam of light.

There will be described below the functions of the job units 1 to 7. The job unit 1 functions on one hand as a decoder for decoding a series of instruction signals transmitted from other job units to thereby actuate such electrical loads as located in the right front part of the vehicular body A, including a plurality of indicator lamps 13 and a cooling fan motor 14, and on the other hand as an encoder for encoding, into a set of signals as data to be put on the data bus 8, those pieces of information which are obtained through a plurality of detection elements 15 detecting the respective status of related detection objects such as a cooling fan switch, a braking fluid switch, and a compressor pressure switch, the detection elements 15 each respectively consisting of a corresponding sensor and an optical switch, as described later. Also, the constitution and function of other job units 2 to 7 are the same as or similar to those of the job unit 1, while the job units 1 to 7 are designed to work following their own programs. The respective job units 1 to 7 are provided, according to their locations, with their proper electrical loads, detection elements suitable for the associated detection objects, and the indication elements and the like.

The management unit 10, separately installed relative to the job units 1 to 7, is connected to the data bus 8 and the supply line 9, in parallel with the job units 1 to 7. Through the data bus 8, all the data from the job units 1 to 7 are transmitted to be read by the management unit 10, which functions as a monitor to verify therefrom respective working conditions of the job units 1 to 7 to be normal.

Incidentally, in FIG. 1, designated at reference numerals 16, 17 are right door controls adapted for the control of front and rear doors (not shown) at the right side of the vehicular body A, respectively, and governed by the job unit 3. Likewise, also at the left side of the vehicular body A, front and rear doors (not shown) are put under control of left door controls 18, 19 governed by the job unit 4, respectively.

Figure 2:
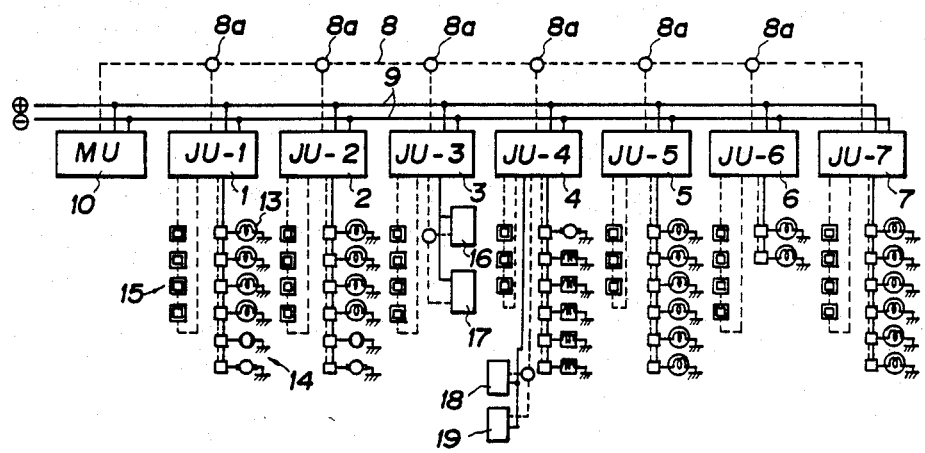

Referring now to FIG. 2 showing the architecture of the multiple communication system of FIG. 1, the job units 1 to 7 (represented by JU-1 to JU-7, respectively) have their decoding/commanding functions for processing to decode their received data and giving their instructions thereunder to the respective associated loads, and their detecting/encoding functions for detecting the status of the respective associated detection objects and encoding their detected pieces of information therefrom into respective sets of data, as described before. Moreover, the job units 1 to 7 and the management unit 10 (represented by MU in the drawings) are all connected through corresponding optical distributors 8a to the data bus 8 as a common line, through which the transmission of various data is made among the job units 1 to 7 and the management unit 10.

Figure 3:
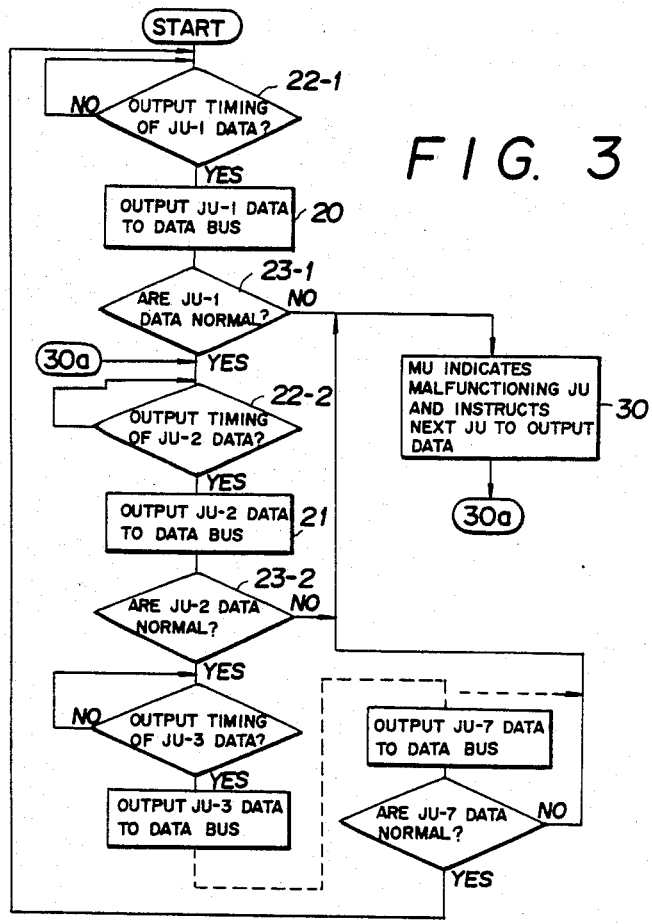
FIG. 3 is a flowchart of data signal transmission covering the multiple communication system of FIG. 1.
Figure 19:
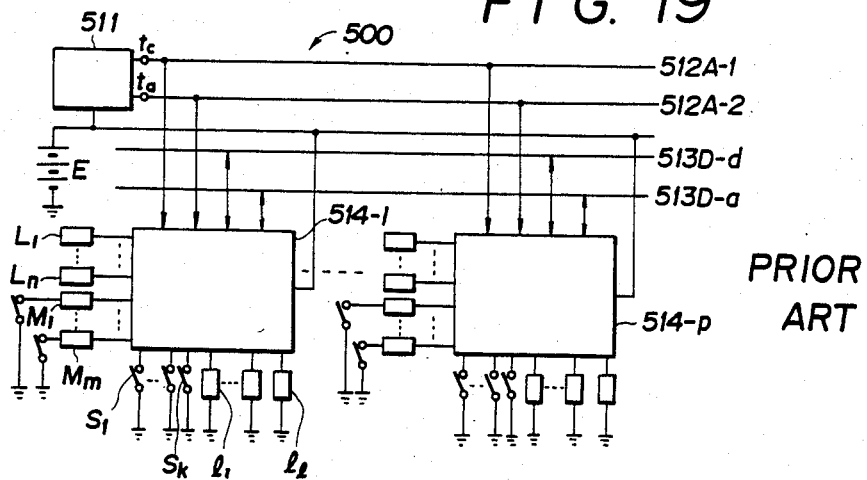
FIG. 19 shows a schematic constitution of a conventional multiple communication system for vehicular bodies.
Figure 4:
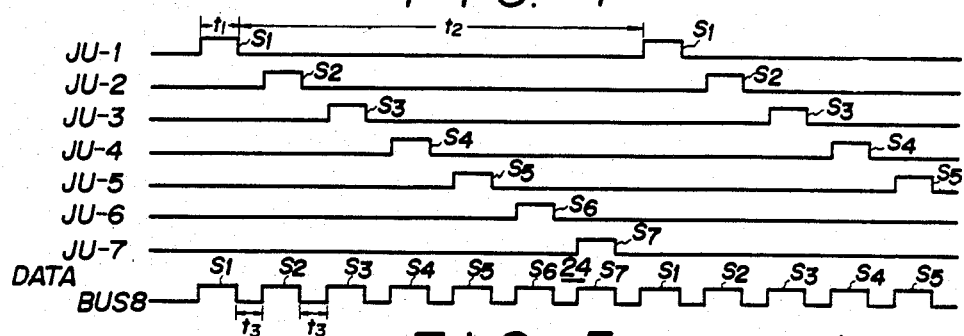
FIG. 4 depicts a set of timing charts of the data signal transmission of FIG. 3.
Figure 5:
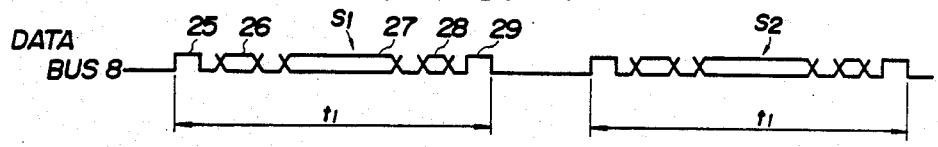
FIG. 5 depicts a timing chart of data signals of certain job units of the multiple communication system of FIG. 1.
Figure 6:
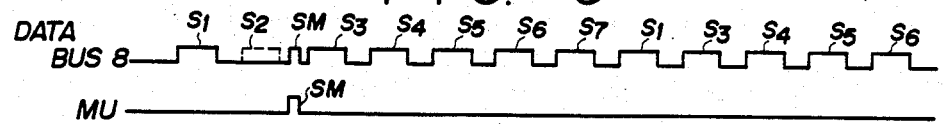
FIG. 6 depicts a pair of timing charts relating to the function of a management unit of the multiple communication system of FIG. 1.

The transmission mechanism of the multiple communication system according to the first embodiment of the invention will be described below, with reference to FIGS. 3 to 6, in which FIG. 3 is a flowchart covering the transmission of data, FIG. 4 is a set of respective timing charts of the data as output from the job units 1 to 7 and put in order on the data bus 8, FIG. 5 is a timing chart of the data being transmitted through the data bus 8, and FIG. 6 is a combination of a timing chart of the data as transmitted through the data bus 8 and a functional timing chart of the management unit 10.

As shown in FIG. 3, when electric power is applied to the system by turning on a power switch (not shown), the system enters a first step in which the job unit 1 functions to output as an action at a process 20, for a predetermined period of time $t_1$, its data consisting of for example particular instructions and detected information, to the data bus 8, which bus 8 transmits them to the remaining job units 2 to 7 and the management unit 10. During the time period $t_1$, the job units 2 to 7 and the management unit 10 receive the above-mentioned data and sequentially operate according to the respective programs thereof such that the units 2 to 7 control the respective associated loads and the unit 10 monitors the condition of the data as transmitted through the data bus 8. In a second step, the job unit 2 functions to output as an action at a process 21, again for the time period $t_1$, its data to the data bus 8, while the remaining job units 1 and 3 to 7 as well as the management unit 10 receive these data and operate similarly to the case of the first step. Likewise, the system sequentially enters third to seventh steps, in which the job units 3 to 7 function in this order to output their data for the same time period $t_1$, respectively, and in each of such steps those job units then remaining as well as the management unit 10 receive such data and operate similarly to the foregoing. The above-described seven steps constitute a looped routine to be repeated by bringing the first step to a subsequent place of the seventh step. In the looped routine, each of the seven steps has put therein, before and after a corresponding one of seven output processes such as the processes 20, 21, a decision box (represented by collective reference numeral 22 hyphenated to a corresponding step number) for judging whether or not the timing of such process is proper and another decision box (represented likewise by reference numeral 23 and a hyphenated step number) for judging whether or not the data as output in such process is normal, respectively, as exemplified in FIG. 3 for the first and second steps by a combination of decision boxes 22-1, 23-1 put before and after the output process 20 and that of decision boxes 22-2, 23-2 before and after the output process 21.

As illustrated in FIG. 4, when mapping respective data through the function of the above-mentioned seven processes, the routine of FIG. 3 provides a septuple of data-output timing charts one-to-one correspondingly associated with the seven job units 1 to 7, whereby the data bus 8 has advanced therealong a series of sets of pulsed data signals $s_1$ to $s_7$ output thereto from the job units 1 to 7, respectively, with their timing controlled in a later-described manner, as exemplified at reference numeral 24. The job units 1 to 7 are adapted so as to output or transmit their data for the time period $t_1$ and to then input or receive to process such data for a predetermined period of time $t_2$, each once in respective rounds of the looped routine, so that for each of the job units 1 to 7 its transmission and reception of data are exclusively made with respect to each other. A series of such transmitting actions of the job units 1 to 7 are sequentially executed by letting, in each step in each round of the routine, all of the other job units, other than the corresponding one transmitting its data, monitor to decode these data, thereby identifying a later-described sequence pointer included therein to specifiy the number of the step corresponding to the next process.

More particularly, as representatively shown in FIG. 5 by taking out that timing-chart portion which covers data signals $s_1$, $s_2$ on the data bus 8 in a certain round of the routine, each of the data signals $s_1$ to $s_7$ as output from the job units 1 to 7 has a data structure comprising a first element 25 consisting of start bits, a second element 26 of address bits, a third element 27 of data bits, a fourth element 28 of parity bits, and a fifth element 29 of stop bits. In the fifth element 29 is encoded the above-mentioned sequence pointer specifying the number of the next step, by providing a particular set of bits for each of the job units 1 to 7.

As described above, a multiple communication system for vehicular bodies according to the invention includes a plurality of job units as control units dispersively arranged in various parts of such a body, the job units performing the transmission and reception of control signals thereamong in a distinctive manner in which such a control signal as transmitted from any job unit is read by the subsequent job unit, thereby repeating a routine in a looped manner. As a result, there is attained a multiple communication of extremely simple architecture, as well as the scale enlargement by the job unit, thus being favorably capable of meeting various requirements for scale enlargement attendant the potential addition of functions.

The data bus 8 inherently has transmitted therethrough the data signals $s_1$ to $s_7$ so output from the job units 1 to 7 in each repeated round of the routine as to be arranged thereon in the order of successive step numbers, as exemplified at 24 in FIG. 4. However, while any of the job units 1 to 7 is malfunctioning for any reason, the management unit 10 detects such abnormal state and gives, as an action at a process 30 of FIG. 3, an abnormality detection signal $s_m$ for instructing each of associated rounds of the routine to jump the output process of the malfunctioning job unit. Namely, as illustrated in FIG. 6, when for example the job unit 2 is caused to malfunction or the performance thereof becomes abnormal, the management unit 10 always reading all the data signals including the signal $s_2$ of the job unit 2 is to detect such abnormality and output the detection signal $s_m$, which informs the system of such malfunction of the job unit 2 and instructs the job unit 3 to output its data signal $s_3$ directly following the completion of the first step associated with the job unit 1. As a result, thereafter and till a normal state is recovered at the job unit experiencing the problem, the routine has repeated respective transmission actions of the remaining job units in the inherently determined order, thus omitting the transmission phase at the malfunctioning job units, i.e., the second step associated with the job unit 2 in this case.

In the foregoing case, the abnormality detection signal $s_m$ also informs the driver of the malfunction (not shown) by a trouble indicator element disposed on an instrument panel (not shown), whereas such an implement for informing the driver of the malfunction may comprise an alarm means.

For the multiple communication system according to the first embodiment, the programs of the job units 1 to 7 and that of the management unit 10 will be described below, with reference to FIGS. 7 and 8.

Figure 7:
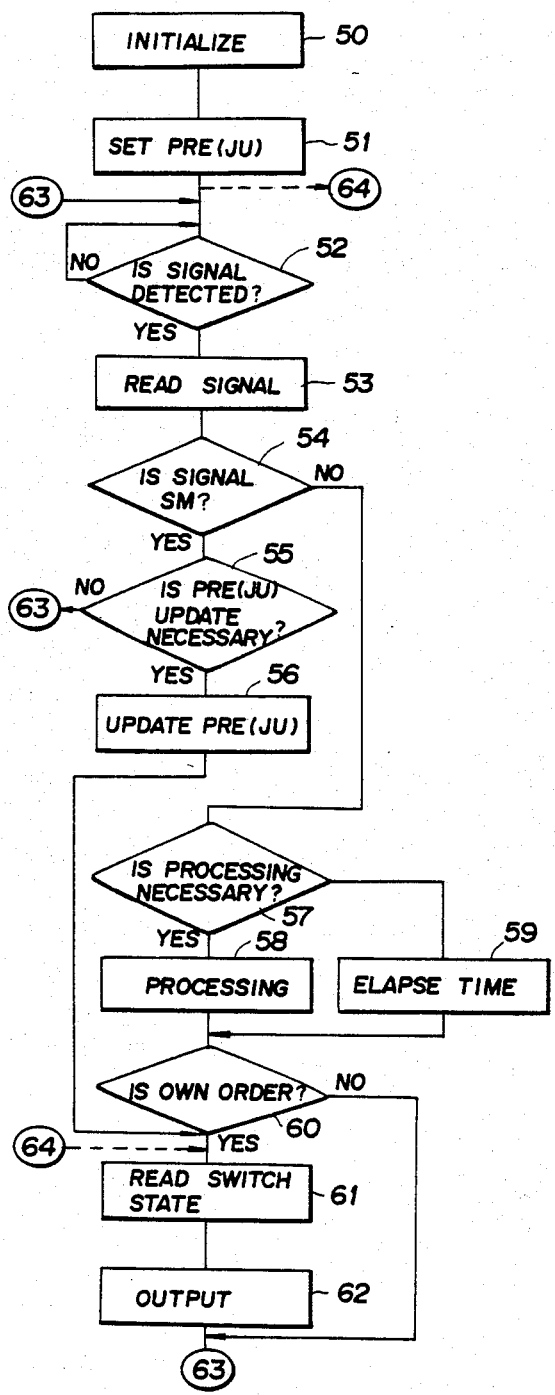
FIG. 7 is a flowchart of a program of each job unit of the multiple communication system of FIG. 1.

FIG. 7 is a flowchart collectively showing the structure of the respective programs of the job units 2 to 7, which programs have the same structure. For the job unit 1, which is required to output the data signal $s_1$ immediately after the application of power to the system, the program structure will be described separately.

Referring to the flowchart of FIG. 7, which is now assumed to be that of the job unit 3 for convenient explanation, upon the application of power to the system or by a resetting operation, the job unit 3 is first initialized at a process stage 50. At a subsequent process stage 51, an internal memory unit (not shown) has written to be set, in a memory location thereof called "Pre(JU)", an address identifying the job unit 2 which is required to output the data signal $s_2$ just before the data transmission of the job unit 3 itself, whereas the address of the job unit 2 is encoded as the stop bits in the fifth element 29 of the data signal $s_2$ of the job unit 2.

Then, at a decision stage 52, a decision is made about whether or not a signal as one data signal or the abnormality detection signal $s_m$ output from any of the remaining job units or the management unit 10, respectively, is detected to be found on the data bus 8. Such a signal, if any on the data bus 8, is read at a process stage 53 by the job unit 3 and temporarily stored without fail in the internal memory unit of the job unit 3. This stored signal is fetched at a decision stage 54, where, when judged not to be the abnormality detection signal $s_m$ output from the management unit 10, it is deemed to be a normal data signal from one of the remaining job units, whereby the program flow is caused to advance to another decision stage 57. At the stage 57, a decision of "processing necessary" is made only when the above-fetched signal includes a set of data concerning any load put under control of the job unit 3. In the case where the decision of "processing necessary" is given, the program subjects the fetched signal to a predetermined process at a process stage 58. On the other hand, where the decision of "process necessary" is not given, the signal in concern has a predetermined period $t_3$ of time elapsed at a process stage 59 before the program flow proceeds to a later-described decision stage 60.

In the above-described program structure, the process at the process stage 58 has accompanied therewith a time lag equal to the delay time period $t_3$ of the process stage 59, which period $t_3$ is predetermined so as to substantially define the time interval between respective neighboring ones of the data signals $s_1$ to $s_7$ on the data bus 8. In this respect, where as the time lag attendant the process of the stage 58 is forecastable a longer period than the delay $t_3$ for the complexity of associated load control, there may be employed a slave CPU in the job unit 3 to transfer thereto associated data to be processed as necessary.

The above-mentioned signal as fetched, when judged at the decision stage 54 to be the abnormality detection signal $s_m$ from the management unit 10, is subjected to a subsequent decision stage 55, where a decision is made about whether or not updating the location Pre(JU) in the internal memory unit of the job unit 3 is necessary. Incidentally, the abnormality detection signal $s_m$ has a data structure thereof composed of an indication element for indicating the occurrence of abnormality and an identification element for identifying the address of a malfunctioning job unit, the identification element including the same stop bits as those in the fifth element 29 of the data signal to be output from the malfunctioning job unit. In the case where such stop bits are the same as those of the job unit 2, then updating the location Pre(JU) of the job unit 3 is judged necessary at the stage 54 and the content of the Pre(JU) is updated at a process stage 56 so as to include the same stop bits as those of the data signal $s_1$ to be output from the job unit 1, whereby, under a judgment that the next job unit required to output a data signal is the job unit 3 itself, the program flow proceeds to a below-described process stage 61. However, where the stop bits in the signal $s_m$ are not equal to those of the job unit 2, then under a judgment that the malfunctioning job unit is other than the job unit 2, the program flow returns to the decision stage 52, while having executed necessary processes such as for the adjustment of associated loads at the respective job units.

In the routine after the time period $t_3$ has elapsed, at either the process stage 58 or 59, there is made at the decision stage 60 a judgment, according to the content of stop bits of the signal as read at the process stage 53, about whether or not the next job unit required to output a data signal is the job unit 3 itself, i.e., whether the own transmission order of the job unit 3 is next. Where the stop bits have the same content as the location Pre(JU) at that time, in which case in the order of data signal transmission the job unit 3 itself is decided to come next, the program flow enters the process stage 61, in which the real status of those switches and sensors associated with the job unit 3 are read, before causing the job unit 3 to output the data signal $s_3$ to the data bus 8 at a routine end process stage 62. After having output the signal $s_3$ at the process stage 62, as well as when at the decision stage 60 the stop bits in the read signal in concern are judged to have a content concurrently unequal to that of the location Pre(JU), the program flow returns to the decision stage 52.

With respect to the job unit 1, the program thereof is different from those of other job units 2 to 7 in that the former is adapted, as shown by broken line in FIG. 7, to jump through a terminal 64 from the process stage 51 to the process stage 61, so that the job unit 1 can output the data signal $s_1$ earlier than the signal transmission of any other job units upon the application of power to the system.

Figure 8:
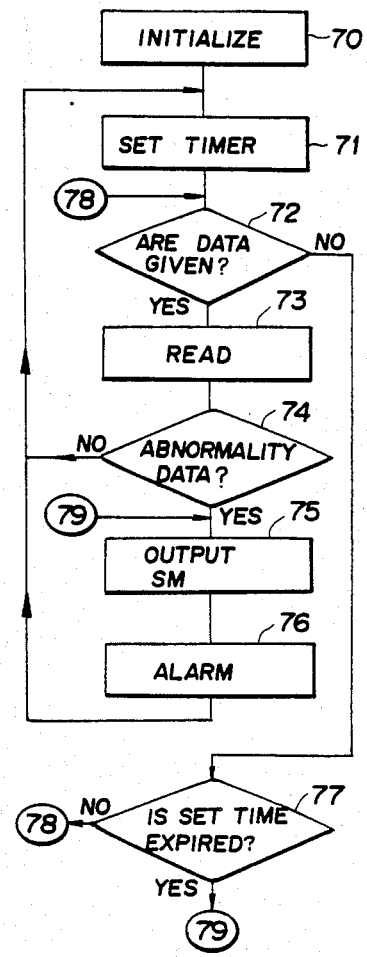
FIG. 8 is a flowchart of a program of the management unit of FIG. 6.

FIG. 8 shows a schematic flowchart of the program of the management unit 10, the description of which will be given below.

Upon the application of power to the system or by a resetting operation, the management unit 10 is first initialized at a process stage 70. At a subsequent process stage 71, an internal timer (not shown) has set thereon a time period substantially twice as long as the sum of the time periods $t_1$ and $t_3$. Then, by means of a programmed interrogation at a decision stage 72 combined with another decision stage 77 for checking the expiration of the time period set on the timer, a decision is made about whether or not a data signal is given within the set time by a certain job unit required in the sequence of data transmission to output the signal within such time. In the case where such signal transmission is made before the expiration of the set time, the data signal is read by the management unit 10 at a process stage 73, before the routine judges at a decision stage 74 about whether or not the data bits in the third element 27 of the given data signal include an abnormal content. When the signal is judged to be free of abnormality, the program flow returns to the process stage 71. When such a judgment is made, at the stage 74, that the given data signal is abnormal or, by the combination of the stages 72, 74, that no data signal is given within the set time, then the program flows to a process stage 75, where it outputs to the data bus 8 the abnormality detection signal $s_m$ composed of the indication element and the identification element of such abnormality, with the stop bits of a corresponding abnormal job unit encoded in the latter element as described before. Following thereto, thereafter an alarm may sound to inform the driver of the occurrence of abnormality at a process stage 71, before the program flow returns to the process stage 71.

In the foregoing embodiment of the invention, a septuple of dispersively arranged job units are employed. However, the number of such job units may be arbitrary and changed as practicable.

Figure 9:
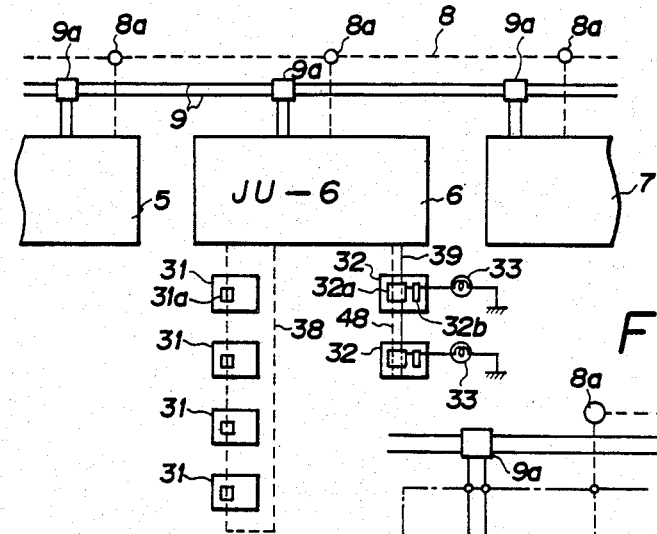
FIG. 9 shows a structural constitution of a typical job unit of the multiple communication system of FIG. 1.
Figure 10:
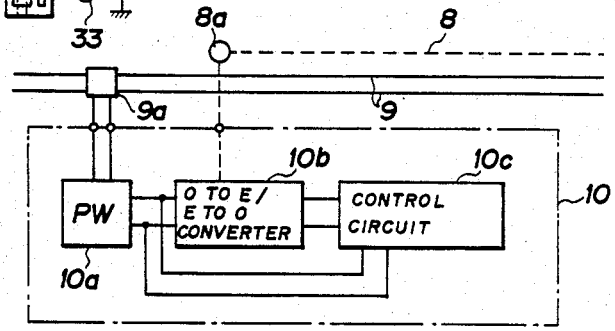
FIG. 10 shows the internal structure of the management unit of the multiple communication system of FIG. 1.
Figure 11:
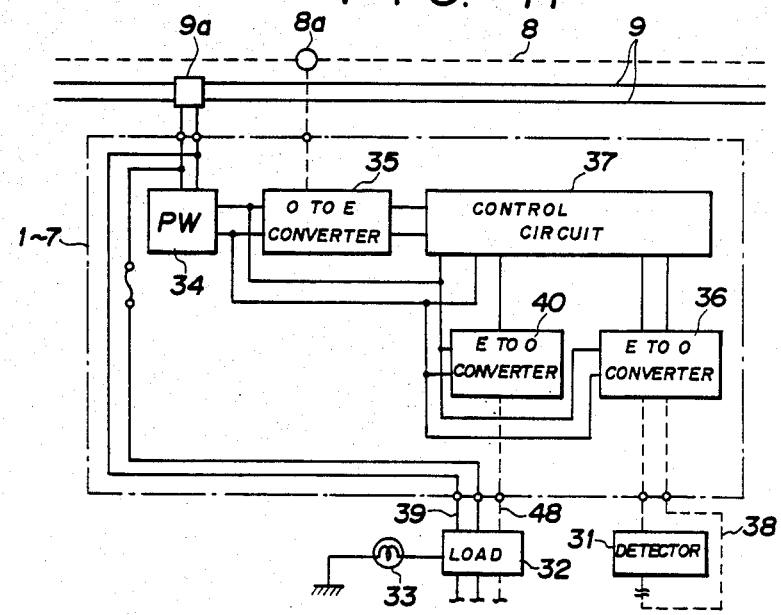
FIG. 11 shows the internal structure of a typical job unit of the multiple communication system of FIG. 1.

Referring now to FIGS. 9 to 11, there will be described below the before-mentioned detection means provided for the job unit 6 as a typical example of all job units 1 to 7, as well as drives for the associated electrical loads, in addition to explanation on the respective inner structures of the job units 1 to 7 and the management unit 10.

In FIG. 9, designated at reference numeral 31 are a quadruple of optical detectors constituting the detection means disposed under the job unit 6, and 32 are a pair of opto-electrical units constituting the drives for the associated loads including a pair of lamps 33. The detectors 31 are connected in series to an optical fiber 38 provided for a wavelength-multiplied transmission of information signals. Each of the detectors 31 comprises a combination of a spectroscopic filter 31a and an optical switch (not shown), which combination is adapted to detect the working condition of the corresponding detection object by passing and interrupting a ray of light having a particular wavelength band. The drive units 32 are each respectively constituted with a spectroscopic element 32a for taking necessary signals from an optical fiber 48 and an electric drive circuit 32b operable with these signals for supplying electric power from an electric conductor 39 to the above-described loads. The optical fibers 38, 48 are connected through the optical distributor 8a to the data bus 8, whereas the electric conductor 39, through an electric coupler 9a to the supply line 9.

FIG. 10 shows the inner structure of the management unit 10, which comprises an O (optical) to E (electrical)/E to O converter 10b connected through an optical distributor 8a to the data bus 8, an electrical logical control circuit 10c connected to the converter 10b, and a stabilized power circuit 10a (represented by PW in the drawing) connected through an electric coupler 9a to the supply line 9, the power circuit 10a supplying electric power to the foregoing respective internal devices.

FIG. 11 shows a typical example of the respective inner structures of the job unit 1 to 7, which comprises an O to E converter 35 connected through the optical distributor 8a to the data bus 8, and a control circuit 37 connected to the O to E converter 35, the control circuit 37 having a CPU (central processing circuit) adapted for electrical logic operations. An E to O converter 36 as an interfacing element is electrically connected to the control circuit 37 and optically connected through the optical fiber 38 to each of the associated detectors 38, and another E to O converter 40 as an interfacing element is electrically connected to the control circuit 37 and optically connected through the optical fiber 48 to each of the associated drive units 32 electrically connected to the corresponding loads 33. A stabilized power circuit 34 (represented by PW in the drawing) is connected through the electric coupler 9a to the supply line 9, the power circuit 34 supplying electric power through the conductor 39 to the foregoing respective internal devices.

As will be understood from the foregoing description, according to the first embodiment of the invention, there is provided a multiple communication system for vehicular bodies, in which various controls as well as the signal transmission are effected in a dispersive control manner and a plurality of job units have their data transmitting and receiving functions adapted to work independently thereamong in a predetermined order, so that the job units are each respectively permitted to be voluntarily provided with plurality of detecting implements, loads, and the like, which facilitates coping with any enlargement of scale attendant various potential expansions of the function of vehicular body. Moreover, in the multiple communication system, the sequential transition of data transmitting action among the job units is effected by having their data signals sequentially output to be mutually read, thus permitting a simple design of system architecture. In addition, respective necessary time periods can be secured for various processes to be executed in accordance with corresponding ones of the data signals. Further, for supervising the transmitting action of the job units, the multiple communication system is provided with a management unit quickly functionable to counter the occurrence of abnormality at any job unit, thereby securing the normal function of the entire system to a maximum extent, thus favorably improving the system reliability. Futhermore, the provision of auxiliary implements such as detection elements, loads, and the like is extremely flexible with respect to addition and design change, as well as in the number of job units, so that the system architecture is permitted to effectively cope with various modifications needing high flexibility. Still more, even if there is trouble at any job part of the system, the possibility of quickly removing such a malfunctioning portion successfully reduces the degree of influences which otherwise may prevail.

There will be described hereinbelow a multiple communication system for vehicular bodies according to a second embodiment of the invention, with reference to FIGS. 12 to 18, whereas the arrangement and structural constitution of the system are similar to those of the first embodiment as exemplified by FIGS. 1, 2 and 9 to 11 and like components are designated at like reference characters without additional description.

Figure 13:
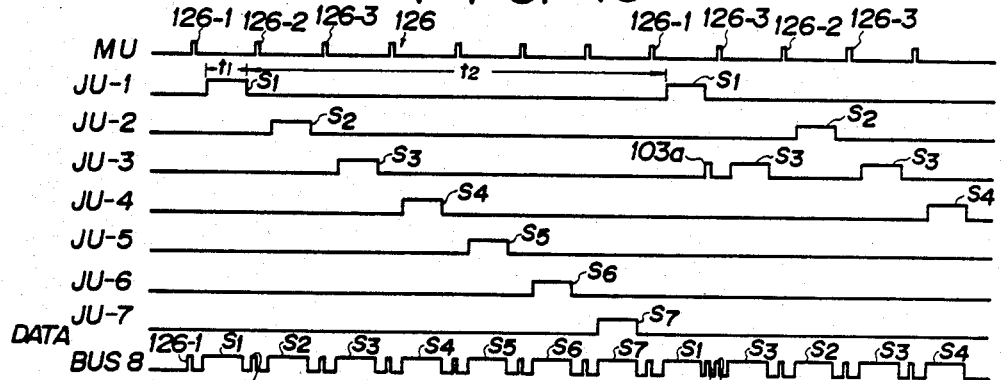
FIG. 13 depicts a set of timing charts of data signal transmission in the flowchart of FIG. 12.
Figure 12:
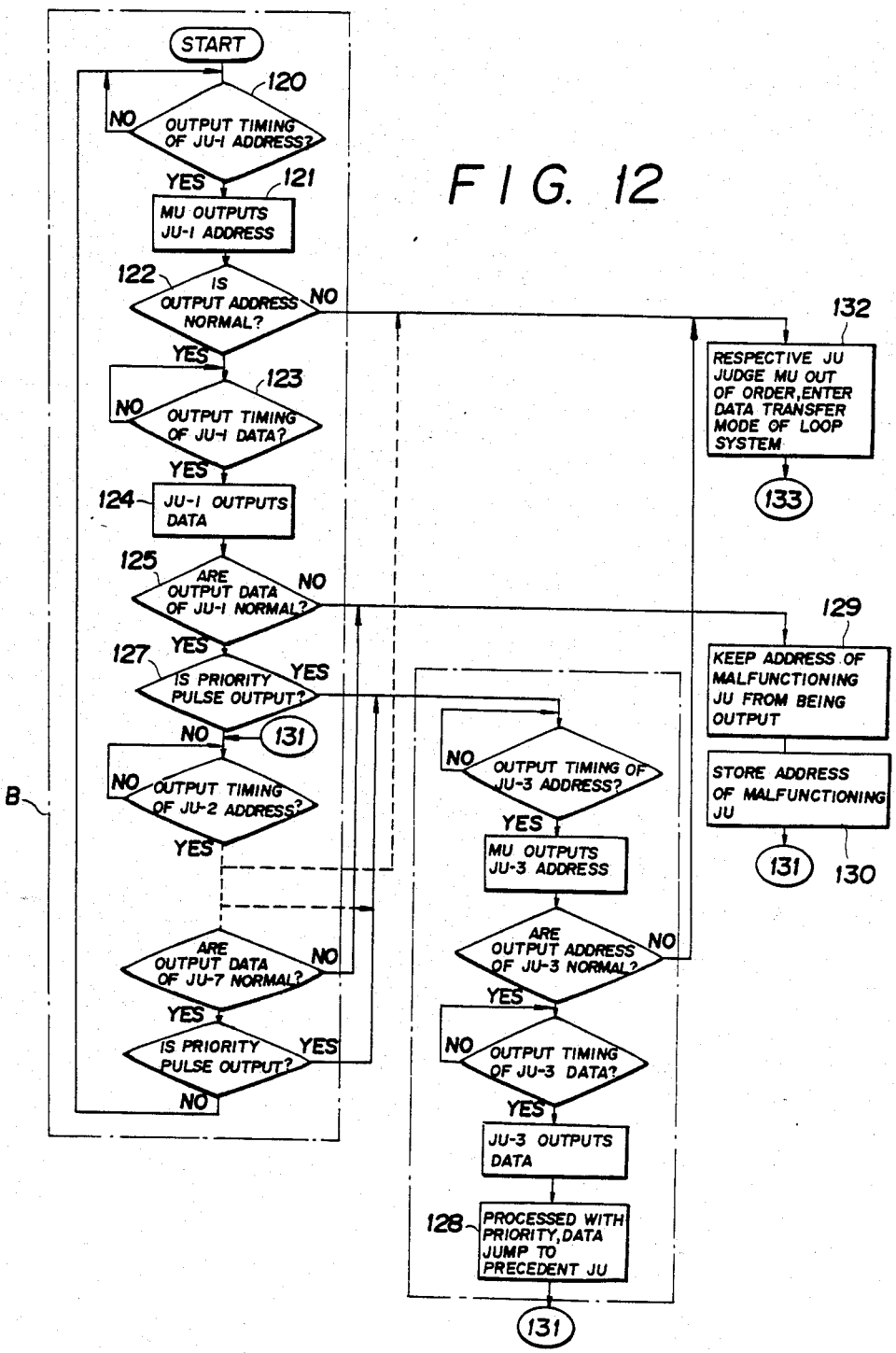
FIG. 12 is a flowchart of a program of a multiple communication system for vehicular bodies according to a second embodiment of the invention.

First, a variety of signal transmitting actions of the multiple communication system according to the second embodiment will be described in conjunction with FIGS. 12 and 13, in which FIG. 12 is a flow chart similar to FIG. 3, showing a signal transmission program of the system, and FIG. 13 is a set of respective signal-output timing charts of a management unit 10 (represented by MU in the drawings) and a septuple of job units 1 to 7 (represented by JU-1 to JU-7, respectively, in the drawings) and a timing chart of respective output signals being transmitted along a data bus 8.

In FIG. 12, designated at reference character B is a main routine of the signal transmission program. The main routine program starts when electric power is applied to the system by turning on a power switch (not shown), and enters a first step in which a judgment is made at a decision box 120 about whether or not the system condition is developed to be at a proper timing to output a JU-1 address signal comprising an instruction element including a set of address bits of the job unit 1, the JU-1 address signal being adapted to instruct the job unit 1 to output to the data bus 8 a data signal covering particular instructions and detection data of the job unit 1. When the system condition is at such timing, the management unit 10 outputs the JU-1 address signal to the data bus 8 as an action at a process 121, before the routine proceeds to a decision box 122, at which is judged whether or not the output JU-1 address signal is normal. Only when the JU-1 address signal is judged to be normal, a subsequent judgment is made at a decision box 123 about whether or not the timing is proper to output the data signal of the job unit 1, before the job unit 1 outputs at a process 124 its data signal to the data bus 8, which tranmits the data signal to the respective remaining job units 2 to 7 and the management unit 10, while the time for such outputting action is predetermined to be a period $t_1$. During the predetermined time period $t_1$, the remaining job units 2 to 7 and the management unit 10 receive the data signal of the job unit 1 and operate according to respective own programs thereof such that the units 2 to 7 control their respective associated loads and the unit 10 monitors the condition of those data transmitted through the data bus 8, to thereby judge as an action at a decision box 125 whether or not such data from the job unit 1 are normal, before the completion of the first step.

In a second step, through a procedure similar to that of the first step, the management unit 10 outputs a JU-2 address signal to the data bus 8, which JU-2 address signal includes a set of address bits of the job unit 2 and instructs the job unit 2 to output a data signal to the data bus 8, while the remaining job units 1 and 3 to 7 as well as the management signal 10 receive the data signal of the job unit 1 and operate similarly to the case of the first step.

Likewise, the system sequentially enters third to seventh steps, in which the job units 3 to 7 function in this order to output their data signals to the data bus 8, depending on JU-3 to JU-7 address signals output by the management unit 10 to the data bus 8, respectively. In each of such steps, those job units then remaining as well as the management unit 10 receive such data signals and operate similarly to the foregoing.

The above-described seven steps constitute the main routine B which is looped to be repeated by bringing the first step to a subsequent place of the seventh step.

As illustrated in FIG. 13, when mapping on a time axis the respective address and data signals output from the management unit 10 and the job units 1 to 7, respectively, the main routine B provides the before-mentioned respective timing charts, in which designated at collective reference numeral 126 as hyphenated to one of step numbers 1 to 7 is that address signal output in the correspondingly numbered step of the routine, and $s_1$ to $s_7$ are the data signals output in the first to seventh steps thereof, respectively. The job units 1 to 7 are adapted so as to output or transmit the data signals $s_1$ to $s_7$ for the same time period $t_1$ and to then input or receive to process such data for a predetermined period $t_2$ of time, each once in respective rounds of the looped routine B, so that for each of the job units 1 to 7 its transmission and reception of data are exclusively made with respect to each other.

Referring again to FIG. 12, there will be described below a priority processing routine C of the signal transmission program of the system. For the convenience of comprehension, the routine C is now exemplarily assumed to be adapted to give an access priority to the job unit 3 with respect to the data transmission, whereas such a priority may be given to any of the seven job units 1 to 7 by correspondingly programming the routine C.

In the looped main routine B, between every neighboring two of the seven steps, there is provided a decision box 127 at which a judgment is made about whether or not a priority demand signal is output from a particular one of the job units 1 to 7, the job unit 3 in this case, to the data bus 8. For example, the first and second steps also have put therebetween the decision box 127 at which, when management unit 10 has received a priority demand pulse 103a output from the job unit 3, the program flow is shifted into the routine C scheduled to give the priority to the job unit 3 to output the data signal $s_3$, whereby the job unit 3 is effectively permitted to transmit without delay to any one of the remaining job units 1, 2 and 4 to 7 those important pieces of information which are concerned with such operations of a driver (not shown) of a vehicular body A as for operating the associated loads put under control of the corresponding job unit. As a result, in such a case that the job units 1 to 7 have their degrees of importance considerably different thereamong with respect to their associated detection means producing various detection signals some of which may be quite frequent in occurrence or some requiring quick control of the associated loads, an extreme flexibility is provided to favorably cope with actual circumstances. In this respect, in a typical case, the access priority may be given to the job unit 7 disposed in the vicinity of a driver's seat (not shown).

In the routine C, the same procedure as the third step of the main routine is executed and, upon the completion of signal transmission of the job unit 3, the flow is subjected to a process 128, at which it is caused to jump to such step in the routine B that is inherently programmed to come in place of the just-completed routine C when no priority demand signal is given, i.e., the flow returns to the second step of the routine B in the above-described example.

When mapping such an example on the timing charts of FIG. 13, a timing relation such as illustrated in the left half part of FIG. 13 will be given. Namely, after the job unit 1 has been caused to output the data signal $s_1$ by the JU-1 address signal 126-1 from the management unit 10, although inherently the JU-2 address signal 126-2 is to be output in the next place, the management unit 10 will output in place of the signal 126-2 the JU-3 address signal 126-3, when it has received the priority demand signal 103a output from the job unit 3, so that the data signal $s_3$ is output from the job unit 3 after the data transmission of the job unit 1. Thereafter, the system condition before the reception of the priority demand signal 103a is recovered, then the data signals are transmitted in their inherent order in accordance with the address signals output from the management unit 10.

As is seen from the foregoing description, in a multiple communication system according to the second embodiment of the invention, when operating a plurality of job units, a particular one thereof is permitted to have a priority of access over the remaining ones, as necessary, so that such a particular job unit has an increased frequency of data signal transmission, thereby possibly achieving an improved control of signal transmission and reception according to the nature of associated data. As a result, those operations needed to be quickly effected, such as a horn-sounding operation for example, may be favorably transmitted in the form of detected data without delay, thus satisfactorily relieving a driver from the sense of incompatibility as well as from the feeling of unnaturalness.

Figure 14:
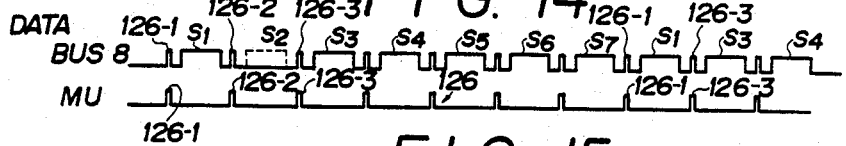
FIG. 14 depicts a pair of timing charts of a management unit of the multiple communication system of FIG. 12.

Referring now to FIG. 14 showing a pair of timing charts, one to be followed by output signals on the data bus 8 and the other by the management unit 10 when the job unit 2 is caused to malfunction, a description of the program will be given below with respect to the counter process against the occurrence of an abnormal condition. For convenient comprehension, the abnormality is now unlimitedly assumed to be attendant the job unit 2, whereas such an abnormality, though being copable with the same process, may happen to exist in any other job unit. As before-described, the management unit 10 sequentially outputs the JU-1 to JU-7 address signals 126-1 to 126-7 to thereby instruct the respective job units 1 to 7 to ouput the corresponding data signals $s_1$ to $s_7$ and reads these signals $s_1$ to $s_7$ to monitor the contents thereof to be verified normal. When, by the management unit 10, an abnormality is detected in the content of the data signal $s_2$ and hence the job unit 2 is judged to be malfunctioning, then the job unit 2 is to be prohibited from further transmission of the data signal $s_2$ in respective rounds of the main routine B. Such an abnormality of any data signal may include, for example, a failure of the corresponding job unit to output the data signal at a proper timing and a failure of the data signal to conform to a proper data format, and any such abnormality is deemed to be caused by a malfunctioning state of the corresponding job unit.

In the flowchart of FIG. 12, the judgment about whether or not a job unit is malfunctioning in the above-mentioned sense is made at the decision box 125 in the corresponding signal transmission step of the main routine B. When any one of the job units 1 to 7 is judged to be malfunctioning, the corresponding step in the main routine B is to be jumped over by the combination of a process 129 for keeping the corresponding address signal from being output and a process 130 for storing an address of the malfunctioning job unit.

Figure 15:
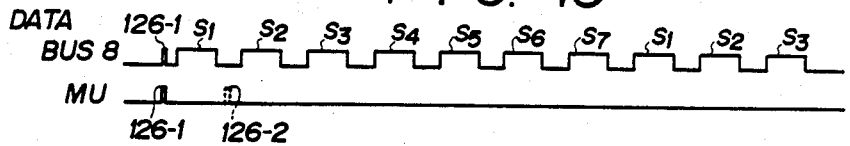
FIG. 15 depicts a pair of timing charts of the management unit, as caused to malfunction, of FIG. 14.

Referring now to FIG. 15 showing a pair of timing charts, one to be followed by output signals on the data bus 8 and the other by the management unit 10 when this unit 10 is caused to malfunction, a further description of the program will be given below with respect to the counter process against the occurrence of an abnormal condition. When the management unit 10 has failed to output, for example, the JU-2 address signal 126-2 at a corresponding proper timing, then the job unit 2 gives an alarm signal as well as other job units and outputs of its own accord the data signal $s_2$. Thereafter, the management unit 10 is kept from outputting any of the address signals 126-1 to 126-7, and the job units 1 to 7 themselves execute their data signal transmission in a looped sequence manner by each respectively reading the data signals $s_1$ to $s_7$ as output just before.

As is seen from the decision box 122 in the main routine B of FIG. 12, the existence of the above-described counter process against a malfunction of the management unit 10 implies that the respective job units 1 to 7 are adapted to always monitor the unit 10 to verify its action to be normal, i.e., in good order. In the case where the management unit 10 is judged to be out of order, the program flow proceeds to a process 132, at which the program is caused to enter into a data transfer mode in which the data signals $s_1$ to $s_7$ are transmitted thereamong in the above-mentioned looped sequence manner, or more concretely by a below-described loop system, without the priority process.

Figure 16:
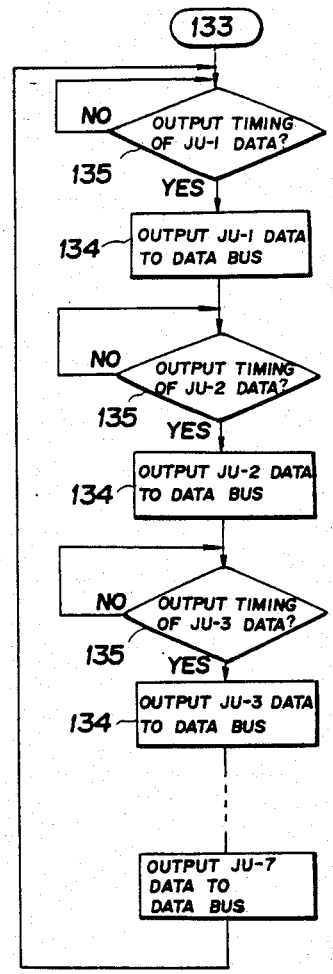
FIG. 16 is a flowchart of data signal transmission in the state of FIG. 15, among job units of the multiple communication system of FIG. 12.

Referring now to FIG. 16 showing a flowchart of a looped routine connected through a terminal point 133 to the process 132 of the program in question, the data transfer mode by the loop system will be described below. This routine comprises a septuple of numbered similar steps sequentially connected into a loop. In a first step, after a judgment at a decision box 135 about whether or not the timing is proper to output the data signal $s_1$, the job unit 1 outputs the signal $s_1$ at a process 134 to the data bus 8, which bus 8 then transmits the signal $s_1$ to the remaining job units 2 to 7 to be thereby controlled as required. The judgment at the decision box 135 is repeated till the timing becomes proper. Also, each of the remaining steps comprises a decision box 135 for the verification of a proper timing to output a corresponding one of the data signals $s_2$ to $s_7$ and a process 134 for outputting the corresponding data signal.

The respective job units 1 to 7 and the management unit 10 of the multiple communication system according to the second embodiment of the invention have their own programs, which will be described below with reference to FIGS. 17a, 17b and 18.

Figure 17A:
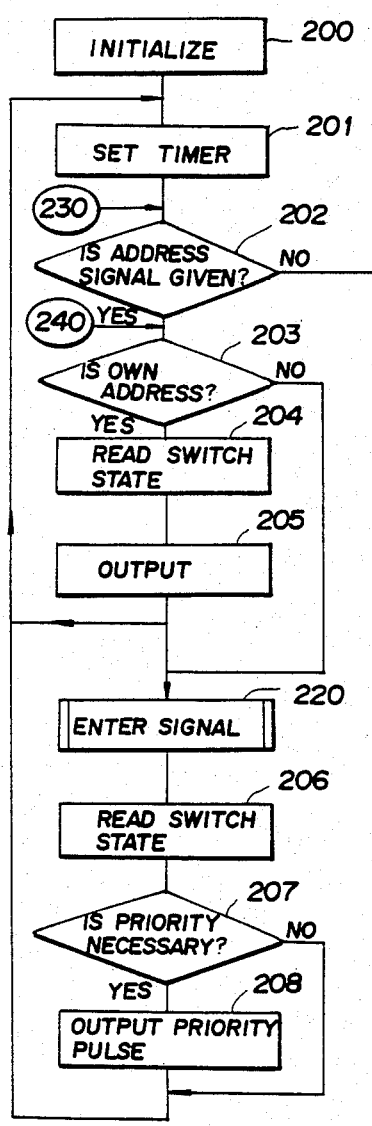
FIGS. 17a and 17b are flowcharts of a program of a typical job unit of the multiple communication system of FIG. 12.
Figure 17A:
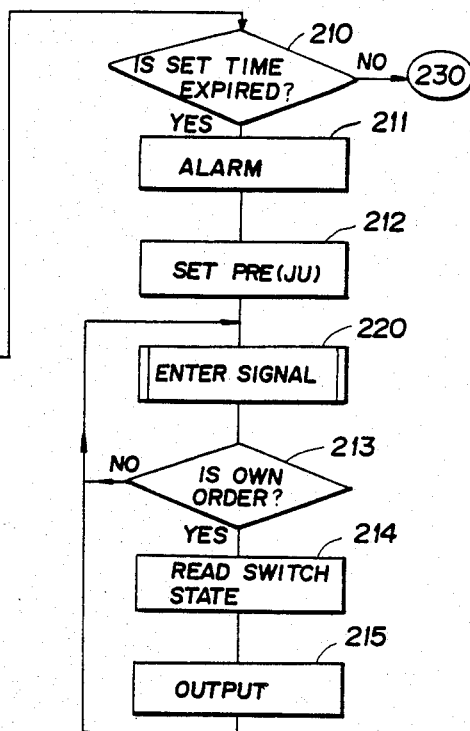

FIG. 17a is a flowchart showing an arbitrary one of the respective programs of the job units 1 to 7, which programs have the same structure. However, for convenience of comprehension, the flowchart is assumed in the following description as a particular one covering the program of the job unit 3.

In this particular flowchart associated with the job unit 3, upon the application of power to the system or by a resetting operation, the job unit 3 is first initialized at a process stage 200. At a subsequent process stage 201, an internal timer (not shown) has set thereon a time period longer than twice the time period $t_1$. Then, by means of a programmed interrogation at a decision stage 202 combined with another decision stage 210 for checking the expiration of the time period set on the timer, a decision is made about whether or not an address signal 126-m ("m" is an arbitrary number within 1 to 7) is given within the set time by the management unit 10. When having verified an address signal 126-m given before the expiration of the set time, the routine further checks at a subsequent decision stage 203 whether or not the address represented by the signal 126-m is that of the job unit 3 itself, i.e., whether or not it is the JU-3 address signal 126-3. Only when the address signal 126-m is identified to be the JU-3 address signal 126-3, the job unit 3 reads at a process stage 204 various data of its own such as the status of associated switches to be encoded into the data signal $s_3$, then at a subsequent process stage 205 outputs the data signal $s_3$. Thereafter the program flow returns to the process stage 201.

In the case where at the decision stage 203 the address signal 126-m is judged not to be the JU-3 address signal 126-3, the program calls a sub-routine 220, in which data signals on the data bus 8 are to be read to enter and processed as necessary. Then, the program flow proceeds to a process stage 206, at which the job unit 3 reads own data such as the status of associated switches, before a judgment at a decision stage 207 about whether or not a demand of access priority is necessary. When the priority demand is judged necessary, the priority pulse 103a is output by the job unit 3, before the program flow returns to the process stage 201, where the job unit 3 again monitors actions of the management unit 10, while waiting the next address signal 126-m from the management unit 10. Also, in the case where the demand of priority is judged unnecessary, the program flow returns to the process stage 201. Incidentally, the priority pulse 103a has a wavelength thereof predetermined to be proper to each corresponding one of the job units 1 to 7, and at the decision stage 202 other priority pulses ouput from other than the corresponding job unit itself are neglected.

On the other hand, where any normally output address signal 216-m is not found even when the time period set on the timer is judged to be expired at the decision stage 210 branching from the decision stage 202, the program flow proceeds to a process stage 211, at which an alarm is given to inform the driver of the occurrence of an abnormal condition at the management unit 10, then as in the first embodiment a location Pre(JU) in an internal memory unit is set to be updated. Thereafter, a sub-routine 220 is called, which reads those data signals caused to enter therein and processes them, as described later. Subsequently thereto, as in the first embodiment, a judgment is made at a decision stage 213 about whether or not the next to come is the job unit 3 itself in the order of data signal transmission. When judged to be the next, the job unit 3 reads at a process stage 214 own data such as the status of associated switches, and at a subsequent process stage 215 outputs the data signal $s_3$. After the process at the stage 215 is completed, and also when at the decision stage 213 the next place has been judged not to be the order of the job unit 3 itself, the program again calls the sub-routine 220. As a result, a looped transmission and reception routine corresponding to the flowchart of FIG. 16 is achieved through the above-mentioned stages 220, 213, 214, and 215.

In addition to the foregoing description, the program as assumed to be of the job unit 3, as well as those of other job units, is adapted such that, in the case where, like in FIG. 15, without the JU-2 address signal 126-2 to be ouput from the management unit 10 a program flow of the job unit 2 has reached the alarming process stage 212 in the program routine of the job unit 3, the program flow of the job unit 3 proceeds to the process stage 214 upon the completion of process at the stage 212.

Figure 17B:
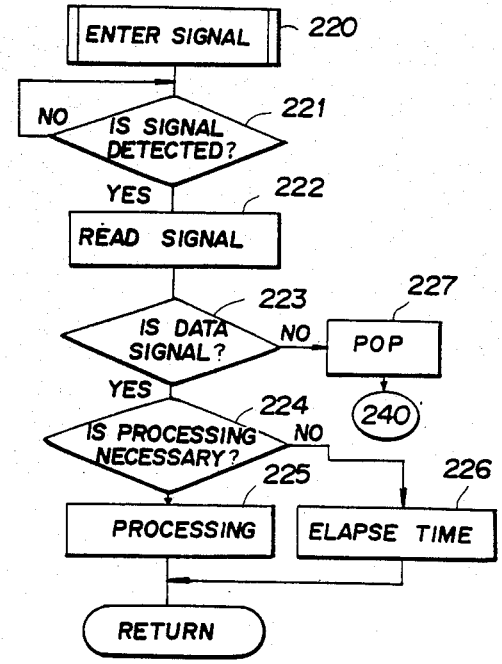

FIG. 17b is a flowchart of the above-mentioned sub-routine 220 which, while respective data signals output on the data bus 8 are normal, reads and processes such data signals through a set of stages 221 to 226, as programmed in advance, before returning to the routine in concern. However, when the job unit 2 fails to output the data signal $s_2$ at a proper timing, wherein the next to be output is the JU-3 address signal 126-3 from the management unit 10 as shown in the left half part of FIG. 14, then with this effect detected at the decision stage 222 the program flow proceeds to the process stage 227, at which a return address waiting stack is popped or reduced by a unit level, thereby causing the flow to jump directly to the decision stage 203, whereas such a jump from the sub-routine 220 to the stage 203 is unexpectable while the management unit 10 is malfunctioning.

Figure 18:
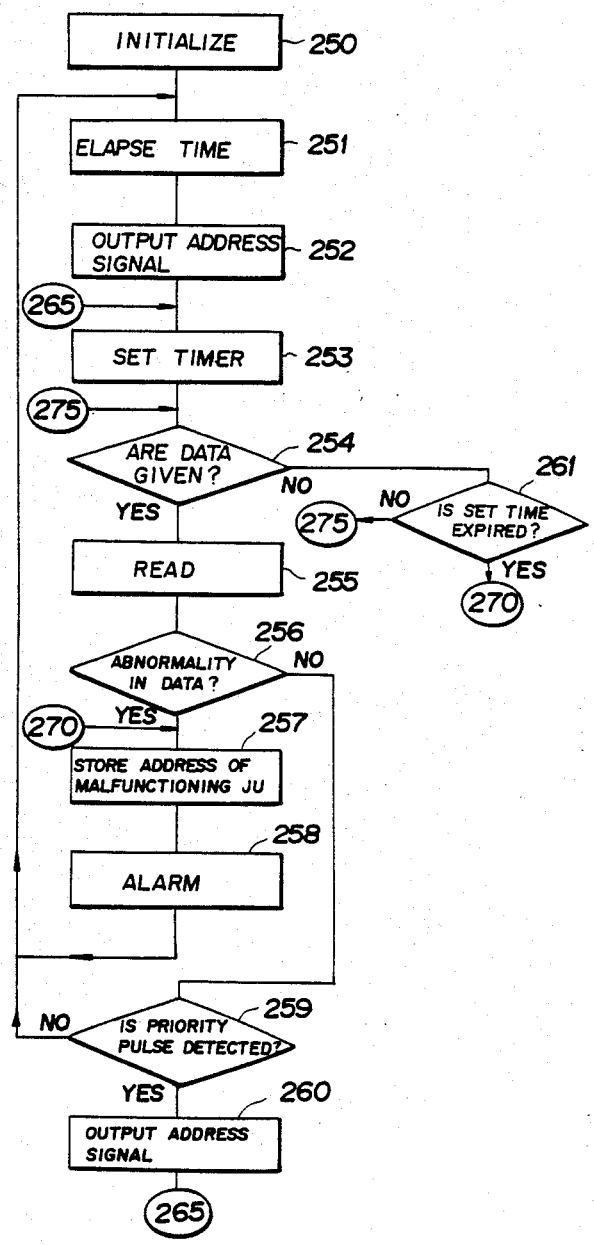
FIG. 18 is a flowchart of a program of the management unit of FIG. 14.

FIG. 18 is a flowchart of the program of the management unit 10. In this flowchart, upon the application of power to the system or by a resetting operation, the management unit 10 is initialized at a process stage 250. At a subsequent process stage 251, like the time period $t_3$ of the first embodiment, the time is elapsed by a necessary period for the execution of respective associated processes programmed in the job units 1 to 7. Thereafter, at a process stage 252, such one of the address signals 126-1 to 126-7 that identifies the address of a particular job unit is output. Through a process stage 253 at which an internal timer has set thereon a time period longer than twice the time period $t_1$, the program flow reaches a decision stage 254 combined with another decision stage 261 for checking the expiration of the time period set on the timer, which stage 254 makes a judgment about whether or not the above-identified job unit has output a data signal thereof before the expiration of the set time period. When judged to be output before the expiration of the set time period, the data signal of the identified job unit is read by the management unit 10 at a process stage 255 and verified at a decision stage 256 for an abnormality of the content. Where the content of the data signal is judged abnormal, the program flow proceeds to a process stage 257 to store the address of the malfunctioning job unit. Then, at a process stage 258 an alarm is given to inform the driver of the occurrence of an abnormal condition and the location thereof, while concurrently the address of the malfunctioning job unit is informed to all the remaining normal job units. Thereafter, the address signal of the malfunctioning job unit is kept from being output. The program flow returns to the process stage 251.

In the foregoing flowchart, also in the case where the data signal of the above-identified job unit is judged at the decision stage 261 not to be given before the expiration of the set time period, the program flow goes to the process stage 257.

On the other hand, where the data signal as read before the expiration of the set time period is judged normal at the decision stage 256, the program flow proceeds to another decision stage 259, at which a judgment is made about whether or not any priority pulse is output from a corresponding one of the job units 1 to 7. When no priority pulse is output, the program flow returns to the process stage 251. However, where a priority pulse is output, a corresponding one of the address signals 126-1 to 126-7 is to be output at a process stage 260, before the flow returns to the process stage 253. In the case where a plurality of priority pulses are output at a time, the management unit 10 once stores them therein and, each time when the program flow passes the decision stage 259, outputs one of them according to the order of priority.

As will be understood from the foregoing description, according to the second embodiment of the invention, there is provided a multiple communication system for vehicular bodies of a dispersive control type in which the order of signal transmitting and receiving actions of a plurality of job units each respectively provided with detection means of various objects as well as electrical loads and the like is controlled with a management unit supported by a data signal transfer among the job units at a proper timing, thus favorably permitting the facilitation to cope with the enlargement of system scale. Moreover, in the multiple communication system, various actions of the respective job units are always monitored by the management unit, which enables a quick counteraction against the occurrence of an abnormal condition at any job unit. Further, in the communication system, the job units are functionable to output their priority demand signals and the management unit is so adapted as to change the transmission order in accordance with the priority demand signals, thus successfully satisfying the functional requirements of associated implements needing quick actions without delay, while effectively relieving a driver from the conventional sense of incompatibility. Furthermore, in the system, each of the job units is adapted to be prohibited, when caused to malfunction, from outputting its signal, so that the removal of such malfunctioning job unit is promptly effected, thus maintaining as high as possible the reliability of the entire system. Still more, the system allows, when the management unit is caused to malfunction, the job units themselves to determine their order of signal transmission on the basis of their own signals even in the case of the occurrence of an abnormal condition at any of them, while concurrently permitting the quick removal of such malfunctioning job unit, thereby securing the normal function of the entire system to a maximum extent.

Although there have been described what are at present considered to be the preferred embodiments of the invention, it will be understood that the present invention may be embodied in other specific forms without departing from the spirit or essential characteristics thereof. The present embodiments are therefore to be considered in all respects as illustrative and not restrictive. The scope of the invention is indicated by the appended claims rather than by the foregoing description.

We claim:

1. A multiple communications system for vehicular bodies, including:
    a plurality of job units dispersively arranged at predetermined locations on a vehicular body;
    said job units each being respectively provided with a detection object as a signal source and an electric load;
    at least one signal line commonly connected to all of said job units;
    means for supplying, from a particular one of said job units, a data signal based on said detection object of said particular job unit to said signal line; and
    a management unit connected to said signal line to receive said data signal as transmitted from each of said job units, to thereby monitor the conditions of respective ones of said job units, wherein:
    when said data signal from said particular job unit is supplied by said means to said signal line, at least one of said job units other than said particular one of said job units inputs and decodes said data signal to drive said electric load of at least one of said job units;
    each of said job units exclusively performs the transmission and the reception of said data signal;
    when said particular job unit transmits said data signal, all the remaining ones of said job units receive said data signal and, in accordance with the content of said data signal, that one of said job units which comes to be next to transmit said data signal is determined, such that the signal transmitting and receiving actions of each of said job units are sequentially executed; and
    said management unit is adapted to supply said signal line with an abnormality detection signal and give an alarm when an abnormality is verified with respect to any of said job units in the sequential signal transmitting actions of respective ones of said job units, to give information on said job unit verified of said abnormality to those of said job units other than said job unit verified of said abnormality to thereby omit a signal transmitting action of said job unit verified of said abnormality after said abnormality detection signal is supplied.

2. A multiple communication system according to claim 1, wherein:
    said signal line comprises an optical fiber.

3. A multiple communication system for vehicular bodies, including:
    a plurality of job units dispersively arranged at predetermined locations on a vehicular body;
    said job units each being respectively provided with a detection object as a signal source and an electric load;
    at least one signal line commonly connect to all of said job units; and
    means for supplying, from a particular one of said job units, a data signal based on said detection object of said particular job unit to said signal line, wherein:
    when said data signal from said particular job unit is supplied by said means to said signal line, at least one job unit other than said particular one of said job units inputs and decodes said data signal to drive said electric load of at least one of said job units;
    said means comprises a management unit connected to said signal line and adapted to output to said signal line an address signal for specifying the signal transmission order of said job units;
    each of said job units sequentially performs the transmission in accordance with said address signal, such that the transmission and the reception of said data signal of each of said job units are exclusively performed;
    each of said job units is adapted to always monitor said address signal from said management unit and to give an alarm when said address signal is verified of an abnormality; and after said address signal is verified of the abnormality, when said particular job unit transmits a data signal, all the remaining ones of said job units receive said data signal and, in accordance with the content of said data signal, that one of said job units which is to come to be next to transmit a data signal is determined, such that the signal transmitting actions of respective said job units are sequentially executed.

4. A multiple communication system according to claim 3, wherein:
at least one of said job units is adapted to output at a predetermined timing a priority demand signal for instructing said at least one of said job units to output said data signal with a priority to those of said job units other than said at least one of said job units, and wherein:
said management unit is adapted to output, when said priority demand signal is output, an address signal for instructing said job unit having output said priority demand signal to execute the signal transmitting action, with a priority to an address signal specifying that one of said job units in a normal place of said signal transmission order.

5. A multiple communication system according to claim 3, wherein:
said management unit is adapted to always monitor said data signal output from each of said job units, and not to output, after said data signal output from any of said job units is verified of an abnormality, an address signal specifying said job unit verified of said abnormality.

6. A multiple communication system according to claim 5, wherein:
said management unit is adapted to give an alarm when any of said job units is verified of said abnormality.

7. A multiple communication system according to claim 3, wherein:
said signal line comprises an optical fiber.

* * * * *

UNITED STATES PATENT AND TRADEMARK OFFICE
CERTIFICATE OF CORRECTION

PATENT NO. : 4,652,853
DATED : March 24, 1987
INVENTOR(S) : Katsutoshi TAGAMI et al.

It is certified that error appears in the above-identified patent and that said Letters Patent is hereby corrected as shown below:

Column 1, line 7, change "generally relates" to --relates generally--;
        line 40, change "5141" to --514-1--;
        line 41, change "$S_1$" to --$S_1$--;
        line 42, change "$M_1$" to --$M_1$--;
        line 43, change "$L_1$" to --$L_1$--.
Column 2, line 2, change "513D -d" to --513D-d--;
        line 16, correct spelling of --becoming--.
Column 4, line 63, after "invention" insert a period;
        line 64, delete "of".
Column 6, line 15, after "line" change "a" to --9--.
Column 12, line 41, before "plurality" insert --a--.
Column 17, line 38, after "202" delete "other"; correct the spelling of --output--.
Column 18, line 2, correct the spelling of --output--.

Signed and Sealed this

Twenty-second Day of September, 1987

Attest:

DONALD J. QUIGG

Attesting Officer    Commissioner of Patents and Trademarks